United States Patent [19]

Bohni

[11] 3,914,434

[45] Oct. 21, 1975

[54] NON-CARIOGENIC FOODS AND DELICACIES CONTAINING XYLITOL AS A SUGAR SUBSTITUTE

[75] Inventor: Erika Bohni, Basel, Switzerland

[73] Assignee: Hoffman-La Roche Inc., Nutley, N.J.

[22] Filed: Dec. 7, 1973

[21] Appl. No.: 422,639

Related U.S. Application Data

[63] Continuation of Ser. No. 248,293, April 27, 1972, which is a continuation of Ser. No. 63,925, Aug. 14, 1970.

[30] Foreign Application Priority Data

Aug. 22, 1969 Switzerland.................... 12767/69

[52] U.S. Cl. ................... 424/343; 424/48; 424/49; 424/180; 426/213; 426/217; 426/218
[51] Int. Cl.² ......................................... A61K 5/00
[58] Field of Search ............ 424/180, 343; 426/213, 426/217, 218

[56] References Cited
UNITED STATES PATENTS

| | | | |
|---|---|---|---|
| 3,278,314 | 10/1966 | Colby et al. | 426/213 |
| 3,296,079 | 1/1967 | Griffin | 424/49 |
| 3,717,711 | 2/1973 | Miller | 424/343 |

OTHER PUBLICATIONS

Scrip 146:17 Mar. 8, 1975, "Birch Sugar Said to be Effective Against Caries".
Schenin et al., Acta Odontologica Scandinavica 32:383–444 (1974) "Turku Sugar Studies".
Chemical Abstracts (1), Vol. 55, Entry 17781fg, 1961, citing Mellinghoff, G. H., Kun, Wochschr, 39:447(1961), "Xylitol as a Substitute Sugar in Diabetics".
Chemical Abstracts (2), Vol. 56, Entry 106501-106-51a, 1962, citing Gutschmidt et al., Deut. Liebensm. Rundschau 57:321-324(1961) "Determination of the Sweetening Strength of Xylitol".
Chemical Abstracts (3), Vol. 61, Entry 1021d, 1964, citing Lang; K., Intern, Zr Vitaminforsch 34:117-122, (1964) "Nutritional and Physiological Properties of Xylitol".
Chemical Abstracts (4), Vol. 73, Entry 43190m, 1970, citing Muehlemann et al., Helv. Odontol. Acta, 1970, 14(1), 48–50 "Effect on Fat Tissue Caries of Xylitol and Sorbitol".

*Primary Examiner*—Shep K. Rose
*Attorney, Agent, or Firm*—Samuel L. Welt; Jon S. Saxe; William M. Farley

[57] ABSTRACT

Non-cariogenic compositions containing in place of sugar, xylitol, a compound having the same sweetening power as sugar but which neither promotes the growth of cariogenic bacteria nor is degraded by cariogenic bacteria to acids which cause caries, are disclosed.

1 Claim, No Drawings

NON-CARIOGENIC FOODS AND DELICACIES CONTAINING XYLITOL AS A SUGAR SUBSTITUTE

This is a continuation of application Ser. No. 248,293 filed Apr. 27, 1972 which is, in turn, a continuation of prior application Ser. No. 63,925 filed Aug. 14, 1970 entitled NON-CARIOGENIC FOODS AND DELICACIES CONTAINING XYLITOL AS A SUGAR SUBSTITUTE

BACKGROUND OF THE INVENTION

Sugars used in human nutrition, such as sucrose and glucose, promote the growth of cariogenic bacteria in the mouth and are, in turn, oxidized to acids by these same bacteria. These acids then attack the surface of the teeth and cause the development of caries.

For some time, attempts have been made either to minimize the sugar remaining in the mouth after eating, to protect the teeth by chemical means, e.g., fluoride coating, or to eliminate the bacteria present in the mouth.

BRIEF SUMMARY OF THE INVENTION

This invention relates to the use of xylitol, a polyhydric alcohol derived from xylose, as the condiment in various candies, cakes and other confectionary preparations — partially or completely replacing the sugars, such as sucrose and glucose, conventionally used therein. Xylitol not only has non-cariogenic properties but also the same sweetening power as the conventional sugars.

DETAILED DESCRIPTION OF THE INVENTION

In a broad embodiment, this invention relates to processes for preventing or reducing the formation of caries, and the resulting compositions, for the preparation of sugar-containing foods and delicacies wherein xylitol is used, at least partially, in their manufacture.

In a specific preferred embodiment, this invention relates to processes for preventing or reducing the formation of caries, and the resulting compositions, wherein the total sugar content of the food or delicacy is replaced by xylitol.

Xylitol is a pentahydric alcohol obtained by the reduction of xylose, a monosaccharide. Xylitol not only has the same sweetening power as the conventional sugars but, more importantly, it neither promotes the growth of cariogenic bacteria in the mouth nor is degraded by such bacteria to caries-causing acids.

The sugar-containing foods and delicacies include those in solid, semi-solid and liquid form, such as baked goods e.g., biscuits and cakes, creams, ices and sugar-containing drinks, e.g., syrups and fruit juices.

This invention especially relates to the manufacture of noncariogenic foods or delicacies with high sugar content such as hard and soft caramels (bonbons), fondant, foam-sugar goods, gum-sugar goods, licorice, sugar coated nuts, sugar coated pharmaceuticals, lozenges, fruit pastes, chewing gum, croquant, effervescent powder, marzipan, persipan, nougat, chocolates and cocoa products, ices, jam, artificial honey and the like. In this process, xylitol is used instead of part of the sugar and preferably used instead of the total amount of sugar. This is possible because xylitol displays about the same sweetening power as conventional sugar.

Of particular interest are candies, especially hard candies, the sugar content of which consists of xylitol. These candies represent a novel product.

Furthermore, this invention is also concerned with a process for inhibiting caries which comprises substitution of xylitol for the sugar requirements of the body.

The following examples illustrate the invention.

EXAMPLE 1

Cubes for sweetening coffee, tea or other liquids are prepared by moistening xylitol with about 2% water, pressing the material into cube form of about 3.3 g each and drying the thus-formed cubes under ultra-violet light.

EXAMPLE 2

Jam is prepared by replacing sucrose by the same amount of xylitol. These jams, as for example, blackberry jam and quince jam, contain about 25 g of xylitol per 100 g.

EXAMPLE 3

Chocolate is prepared using xylitol instead of conventional sugar. The chocolate has a xylitol content of about 24%.

EXAMPLE 4

An effervescent powder is prepared by admixing the following ingredients:

| | |
|---|---|
| Xylitol | 903.2 g |
| Tartaric acid | 60.0 g |
| Sodium carbonate | 35.0 g |
| Orange aroma | 1.5 g |
| Dye | 0.3 g |

11 g aliquots of this powder are added to aluminum packets and the packets are then sealed. Each packet is used to prepare one glass (about 100 to 150 ml) of lemonade.

EXAMPLE 5

Biscuits are prepared using xylitol instead of the conventional sugar.

EXAMPLE 6

Hard candies are prepared using xylitol instead of conventional sugar.

EXAMPLE 7

This Example shows that xylitol, in contrast to glucose, neither promotes the growth of cariogenic bacteria nor is degraded to acid by cariogenic bacteria.

The growth of two Streptococcus strains known to be strongly cariogenic is determined in 21 passages (incubation for 24 hours at 37°C.) on the following media:
 a. Nutrient Medium containing 0.5% glucose
 b. Nutrient Medium containing 0.5% xylitol
 c. Nutrient Medium — sugar free.

Observations as to both growth-intensity and degradation of the glucose or xylitol are made.

The growth-intensity is determined from the turbidity using transmittance measurements with a 530 A filter in a Bausch and Lomb Instrument. These transmittance measurements are reported as percentages (%T) of total transmittance obtained using an uninoculated nutrient medium as the standard.

The degradation of the glucose and xylitol to acids is determined by pH measurements. These measurements are reported as ΔpH — the change in pH from the initial measurement (before inoculation) to the final measurement (after 24 hours incubation at 37°C.).

The results are tabulated below in Table 1.

| Medium Streptococcus Strain | Nutrient + 0.5% Glucose | | | | Nutrient + 0.5% Xylitol | | | | Nutrient-Sugar Free | | | |
|---|---|---|---|---|---|---|---|---|---|---|---|---|
| | 1st | | 2nd | | 1st | | 2nd | | 1st | | 2nd | |
| | %T | ΔpH | %T | ΔpH | %T | ΔpH | %T | ΔpH | %T | ΔpH | %T | ΔpH |
| Passages | | | | | | | | | | | | |
| 1 | 6 | −1.7 | 3 | −1.7 | 60 | +0.3 | 51 | +0.4 | 30 | +0.3 | 40 | +0.3 |
| 2 | 6 | −1.8 | 5 | −2.8 | 76 | 0 | 76 | +0.1 | 53 | 0 | 62 | +0.1 |
| 3 | 5 | −1.8 | 5 | −1.9 | 48 | −0.1 | 73 | 0 | 36 | −0.1 | 69 | +0.1 |
| 4 | 5 | −1.8 | 6 | −1.9 | 35 | −0.2 | 76 | +0.1 | 36 | −0.3 | 67 | 0 |
| 5 | 5 | −1.8 | 6 | −1.9 | 41 | −0.1 | 70 | +0.1 | 41 | −0.1 | 73 | +0.1 |
| 6 | 4 | −1.8 | 5 | −1.9 | 39 | −0.1 | 67 | +0.1 | 39 | −0.1 | 62 | +0.1 |
| 7 | 3 | −1.8 | 4 | −1.9 | 39 | −0.1 | 71 | +0.1 | 34 | −0.1 | 67 | +0.1 |
| 8 | 4 | −1.8 | 6 | −2.0 | 38 | −0.1 | 72 | 0 | 33 | −0.1 | 66 | +0.1 |
| 9 | 4 | −1.9 | 6 | −1.9 | 38 | −0.1 | 72 | −0.1 | 36 | −0.1 | 70 | +0.1 |
| 10 | 5 | −1.8 | 6 | −1.8 | 42 | −0.1 | 38 | +0.1 | 35 | −0.1 | 60 | +0.1 |
| 11 | 4 | −2.5 | 3 | −2.6 | 32 | −0.1 | 47 | 0 | 37 | −0.1 | 71 | 0 |
| 12 | 4 | −2.6 | 3 | −2.6 | 37 | −0.1 | 47 | −0.1 | 32 | −0.1 | 65 | +0.1 |
| 13 | 4 | −2.5 | 3 | −2.5 | 39 | −0.1 | 49 | 0 | 39 | −0.1 | 67 | +0.1 |
| 14 | 4 | −2.0 | 2 | −2.7 | 38 | 0 | 54 | +0.2 | 36 | 0 | 83 | +0.1 |
| 15 | 4 | −2.5 | 3 | −2.5 | 38 | −0.2 | 60 | 0 | 36 | 0 | 59 | +0.1 |
| 16 | 4 | −2.6 | 3 | −2.6 | 32 | −0.1 | 59 | 0 | 38 | 0 | 66 | −0.1 |
| 17 | 4 | −2.5 | 3 | −2.6 | 36 | −0.1 | 55 | 0 | 36 | −0.1 | 66 | 0 |
| 18 | 4 | −2.5 | 3 | −2.5 | 31 | 0 | 35 | 0 | 33 | −0.1 | 62 | +0.1 |
| 19 | 5 | — | 3 | — | 36 | — | 51 | — | 39 | — | 64 | — |
| 20 | 5 | −2.5 | 3 | −2.5 | 36 | −0.1 | 47 | −0.1 | 36 | −0.1 | 66 | −0.1 |
| 21 | 4 | −2.0 | 5 | — | 35 | 0 | 51 | — | 36 | −0.1 | 63 | — |

These results show that the two Streptococcus strains grow very well on the nutrient medium containing 0.5% glucose and ferment (i.e., oxidize the sugar to acid) this nutrient medium to a normal degree. The resulting acid lowers the pH value by about 2 to 2.5 units.

In contrast, the Streptococcus strains grow substantially less on the xylitol—containing nutrient medium and there is essentially no oxidation of the xylitol to acid as shown by the minimal pH alteration. In fact, bacterial growth and fermentation in the nutrient medium containing 0.5% xylitol and in the sugar-free nutrient medium are practically equivalent.

EXAMPLE 8

This example shows that the addition of xylitol to the normal feed supply does not increase the incidence of dentine lesions Rats are fed for 6 weeks on a diet of
a. Altromin R — a normal feed without sugar addition,
b. Altromin R + 5% sucrose,
c. Altromin R + 10% sucrose,
d. Altromin R + 5% xylitol or
e. Altromin R + 10% xylitol.

Altromin R is available from Messrs. Kunath, Aarau, Switzerland and contains 45% of barley, 18% of oats, 10% of corn, 6% of fish meal, 6% of meat meal, 5% of barm, 4% of glover meal, 3% of wheat germs and 3% of minerals and vitamins.

After 6 weeks the rats are evaluated for dentine lesions. The results are tabulated in Table 2 below where the numerical values are calculated indices derived from quantitative counts of either slight or moderate dentine lesions.

TABLE 2

| Type of caries<br>Diet | Slight Dentine lesions | Moderate Dentine lesions |
|---|---|---|
| "Altromin R" | 2.07 | 0.07 |
| "Altromin R" +5% sucrose | 3.23 | 0.31 |
| "Altromin R" +10% sucrose | 4.36 | 1.0 |
| "Altromin R" +5% xylitol | 1.36 | 0.07 |
| "Altromin R" +10% xylitol | 2.60 | 0.27 |

These results show that the dentine lesions resulting from feedings with xylitol-containing "Altromin R" diet are no greater than the dentine lesions resulting from the feedings with sugarfree Altromin R diet. With feedings using sucrose-containing Altromin R diet, dentine lesions are more frequent than those resulting from the feeding with sugar-free Altromin R diet by a factor of from 1.5 to 14.

I claim:
1. A method of moderating the incidence of severe dentine lesions and thereby inhibiting dental caries which comprises orally ingesting, or feeding, as the total sugar content of the diet of individuals with teeth otherwise susceptible to caries caused by the ingestion of sugar, nutrient media containing xylitol sugar substitute as the sole sweetening agent.

* * * * *